(12) United States Patent
Hollingsworth

(10) Patent No.: US 10,585,978 B2
(45) Date of Patent: Mar. 10, 2020

(54) METHOD AND SYSTEM FOR PROVIDING A SUMMARY OF TEXTUAL CONTENT

(71) Applicant: Skimcast Holdings, LLC, Atlanta, GA (US)

(72) Inventor: William A Hollingsworth, Commerce, GA (US)

(73) Assignee: Skimcast Holdings, LLC, Atlanta, GA (US)

( * ) Notice: Subject to any disclaimer, the term of this patent is extended or adjusted under 35 U.S.C. 154(b) by 0 days.

(21) Appl. No.: 15/891,893

(22) Filed: Feb. 8, 2018

(65) Prior Publication Data

US 2018/0157628 A1    Jun. 7, 2018

Related U.S. Application Data

(63) Continuation-in-part of application No. 14/165,717, filed on Jan. 28, 2014.

(60) Provisional application No. 62/456,455, filed on Feb. 8, 2017.

(51) Int. Cl.
| | | |
|---|---|---|
| *G06F 17/27* | (2006.01) | |
| *G06F 17/22* | (2006.01) | |
| *G06F 3/0482* | (2013.01) | |

(52) U.S. Cl.
CPC ........ *G06F 17/2264* (2013.01); *G06F 3/0482* (2013.01); *G06F 17/2765* (2013.01); *G06F 17/2785* (2013.01)

(58) Field of Classification Search
CPC ............. G06F 17/2264; G06F 17/2765; G06F 3/0482; G06F 17/2785

USPC ....... 704/9, 10; 707/610; 715/201, 254, 764; 706/47

See application file for complete search history.

(56) References Cited

U.S. PATENT DOCUMENTS

| | | | | |
|---|---|---|---|---|
| 6,205,456 | B1 * | 3/2001 | Nakao | G06F 17/30719 707/999.003 |
| 6,369,811 | B1 * | 4/2002 | Graham | G06F 3/0481 715/764 |
| 7,162,413 | B1 * | 1/2007 | Johnson | G06F 17/30719 704/9 |
| 7,587,309 | B1 * | 9/2009 | Rohrs | G06F 17/30719 704/10 |
| 2003/0046263 | A1 * | 3/2003 | Castellanos | G06F 17/30719 |
| 2010/0162314 | A1 * | 6/2010 | Meare | H04N 5/445 725/44 |

(Continued)

*Primary Examiner* — Md S Elahee
(74) *Attorney, Agent, or Firm* — Bekiares Eliezer LLP

(57) ABSTRACT

Disclosed herein a method of and system for providing a summary of a document. The method may comprise identifying, using a processor, a plurality of salient excerpts from the document. Further, the method may comprise generating, using the processor, the summary of the document based on the plurality of salient excerpts. The method may comprise receiving at least one parameter configured to control the generating of the summary. Accordingly, identifying or generating may be based on the at least one parameter. The method may further comprise identifying a plurality of key terms in the document. Moreover, the method may include ranking each sentence of the document based on the plurality of key terms. Additionally, the method may comprise identifying a set of key sentences based on the ranking. Further, the set of key sentences may constitute the plurality of salient excerpts.

29 Claims, 13 Drawing Sheets

(56) References Cited

U.S. PATENT DOCUMENTS

| | | | | |
|---|---|---|---|---|
| 2011/0289038 A1* | 11/2011 | Jordan | ..................... | G06N 5/04 |
| | | | | 706/47 |
| 2013/0332412 A1* | 12/2013 | Amarendran | ..... | G06F 17/30011 |
| | | | | 707/610 |
| 2014/0195897 A1* | 7/2014 | Balinsky | ........... | G06F 17/30719 |
| | | | | 715/254 |
| 2017/0060824 A1* | 3/2017 | Sunderland | ......... | G06F 17/2235 |

* cited by examiner

METHOD AND SYSTEM FOR PROVIDING A SUMMARY OF TEXTUAL CONTENT

RELATED APPLICATION

The present application is a continuation-in-part to earlier filed U.S. patent application Ser. No. 14/165,717, listing an inventor in common and filed by a common application, the disclosure of which is incorporated herein. In addition, the present application is a non-provisional conversion from an earlier filed U.S. Provisional Patent Application No. 62/456,455, the disclosure of which is incorporated herein. It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to digital data processing. More specifically, the present disclosure relates to a method of and a system for generating a summary of a document.

BACKGROUND

The advent of the information age has resulted in generation of huge quantity of digital content which is growing continuously. In particular, even when users are selectively presented with content based on a limited set of interests, due to the vast amount of information, users may be overwhelmed. Accordingly, there is a need to present information to users in a way that does not impose a burden on the users.

Conventional technology provides limited functionality in summarizing textual content such as, for example, a webpage comprising online textual content or an electronic document (referred to hereafter as a "document"). Accordingly, users of conventional technology may be presented with a summary of a document in order to help the users to quickly consume salient information present in the document. However, such existing technology at least does not provide, for example, sufficient flexibility to content publishers in controlling the process of generating those summaries.

Further, a large quantity of information on the Internet is available in the form of webpages hosted by content servers. These webpages are generally stored in content management systems. One technical difficulty facing the provisioning of summaries to those webpages is the large number of webpages (HTML documents) to be processed without affecting other aspects of the HTML documents, such as the ability to deliver targeted advertisements to users within the HTML documents.

Accordingly, there is a need for improved methods and systems for generating summaries of textual content in various forms of electronic documents.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A method of and system for generating a summary of textual content within an electronic document may be provided. The term document may be used, throughout the present disclosure, to define any electronic media through which textual content may be provided, including, but not limited to, webpages, articles, Word Documents, and PDF documents. Methods described herein may include a stage of identifying, using a processor, a plurality of salient excerpts from the document. A summary of the document may be subsequently generated based on the plurality of salient excerpts.

Additionally, in some embodiments, methods may include identifying a plurality of themes associated with the document. The themes may then be displayed with a plurality of theme indicators corresponding to the plurality of themes. Each theme may have a corresponding set of salient excerpts identified within the document. The identifications of the salient excerpts may be, for example, color coded within the document after they have been identified.

Additionally, in some embodiments, methods disclosed herein may include receiving at least one parameter configured to control at least one of the following: the summary generation, the identification of themes, and the display of the identified themes and corresponding excerpts within the document. As will be further described in the Detailed Description, the at least one parameter may be configured remotely from a computing device rendering the document and/or defined within a source code associated with the document. In this way, a publisher of the document may configure and modify the parameters by which summaries to the document are generated subsequent to the publication of the document.

Still consistent with embodiments of the present disclosure, methods may comprise the stage of identifying a plurality of key terms in the document. In turn, each sentence of the document may them be ranked based on the plurality of identified key terms. Next, a set of key sentences within the document may be determined based on the ranking. The set of key sentences may in turn constitute the plurality of salient excerpts.

Furthermore, in some embodiments, the method may include receiving, from an input device, a desired length for the summary of the textual content within the document. The identifying of key sentences may be based on the desired length of the summary. In other words, users may select the length of the summary according to individual preferences. As will be detailed below, the input device may comprise i) a publisher device used to specify the document as well as the underlying parameters associated with rendering summaries to the document; and/or ii) an end-user device used to consume the document and the rendered summaries associated with the document.

Moreover, in some embodiments, methods may further include identifying, using the processor, key terms in the summary. The key terms may then be ranked and, based on their ranking, be included as themes associated with the document, having their corresponding sentences marked as salient excerpts. As a result, the plurality of themes identified by the method may be more accurate.

Embodiments of the present disclosure may provide an administrative interface comprising a document specification for at least one document to be published. In turn, a script may be embedded into an underlying source code associated with the document. The script may comprise instructions for rendering the document and a corresponding summary to the textual content of the document. The instructions may comprise, within the script, at least one parameter. The administrative user may be enabled to specify said parameter to affect the publication and summarization of the document on an end-user's device. The at least one parameter may define, but not be limited to, at least one of a percentage value, a summary display mode and a theme display mode. The rendering of the document (e.g., displaying the document on the end-user device) may cause execution of the script. Furthermore, the identifying of the plurality of salient excerpts may also be based on the at least one parameter.

The execution of the script may enable a communication between, via a communication interface, an administrative user (e.g., a publisher) and it's device (e.g., a server) with an end-user (e.g., consumer) and their device. The communication may be in the form of an application programming interface (API) communication interface. Accordingly, execution of the script may cause generation of the API call. Further, the API call may include a document indicator associated with a document specified for publication. In this way, a server comprising, for example, a content management system, may be enabled to identify the document being published and retrieve the textual content to be summarized, as well as the parameters by which the summarization is configured to be generated.

Once the summary is generated it may be transmitted to the end-user device using, for example, the communication interface. The source code may include instructions for rendering the document as well as a corresponding summary on an end-user's device. Those instructions may be transmitted to the end-user's device via the API call. Thus, in various embodiments, methods disclosed herein may be performed based on API calls from a document rendering software (e.g., a web browser) associated with an end-user device and, for example, a content management system associated with a server.

Further, the summary may be automatically displayed based on a value of the summary display mode. Similarly, a plurality of theme indicators may be automatically displayed based on the theme display mode. For example, if a display mode and theme indicators are set to a value corresponding to an 'displayed' state, then the summary and theme indicators may be automatically presented within the document when the document is rendered to the end-user. In other examples, the values associated with the display and the theme modes may correspond to a 'hidden' state in which the end-user may be required to perform an action (e.g., a selection of a button in an end-user interface) in order to change their state to 'displayed'.

Accordingly, the end-user may be enabled to change the parameters associated with the document via, for example, an end-user interface rendered within the document. The aforementioned script embedded in the document by, for example, an admin user's setting in, for example, a content management system, may provide the instructions for the display and rendering of the end-user interface.

Still consistent with embodiments of the present disclosure, the aforementioned document summarization, themes, and display state configuration and rendering may further apply to the provision of a display modal. The display modal may comprise at least one of the following: the document summary, themes, and highlighted excerpts. The display modal may be configured by an administrative user to specify a document to which the summary, themes, and highlighted excerpts related, as well as the parameters on which the summary, themes, and excerpts may be based. The display modal may then be displayed using the communication interface between a server and an end-user device as detailed herein. The display may comprise a separate document or be embedded within the corresponding document. In various embodiments, the display modal may be displayed in conjunction with a link to a different document, leading to the summarized document (e.g., a uniform resource locator (URL)). In such embodiments, a selection of the link may trigger the display of the modal. A selection may comprise, but not be limited to, for example, a hover of the user's mouse over a display area associated with link.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 11 illustrates a screenshot of a user-interface depicting a summary of a document and a plurality of themes in accordance with some embodiments.

FIG. 12 illustrates a screenshot of a user-interface depicting salient excerpts identified in order to generate a summary of the document in accordance with some embodiments.

FIG. 13 illustrates a screenshot of a user-interface depicting relevant excerpts of a document highlighted in response to a selection of a theme from the plurality of themes in the document in accordance with some embodiments.

DETAILED DESCRIPTION

Figure 1:
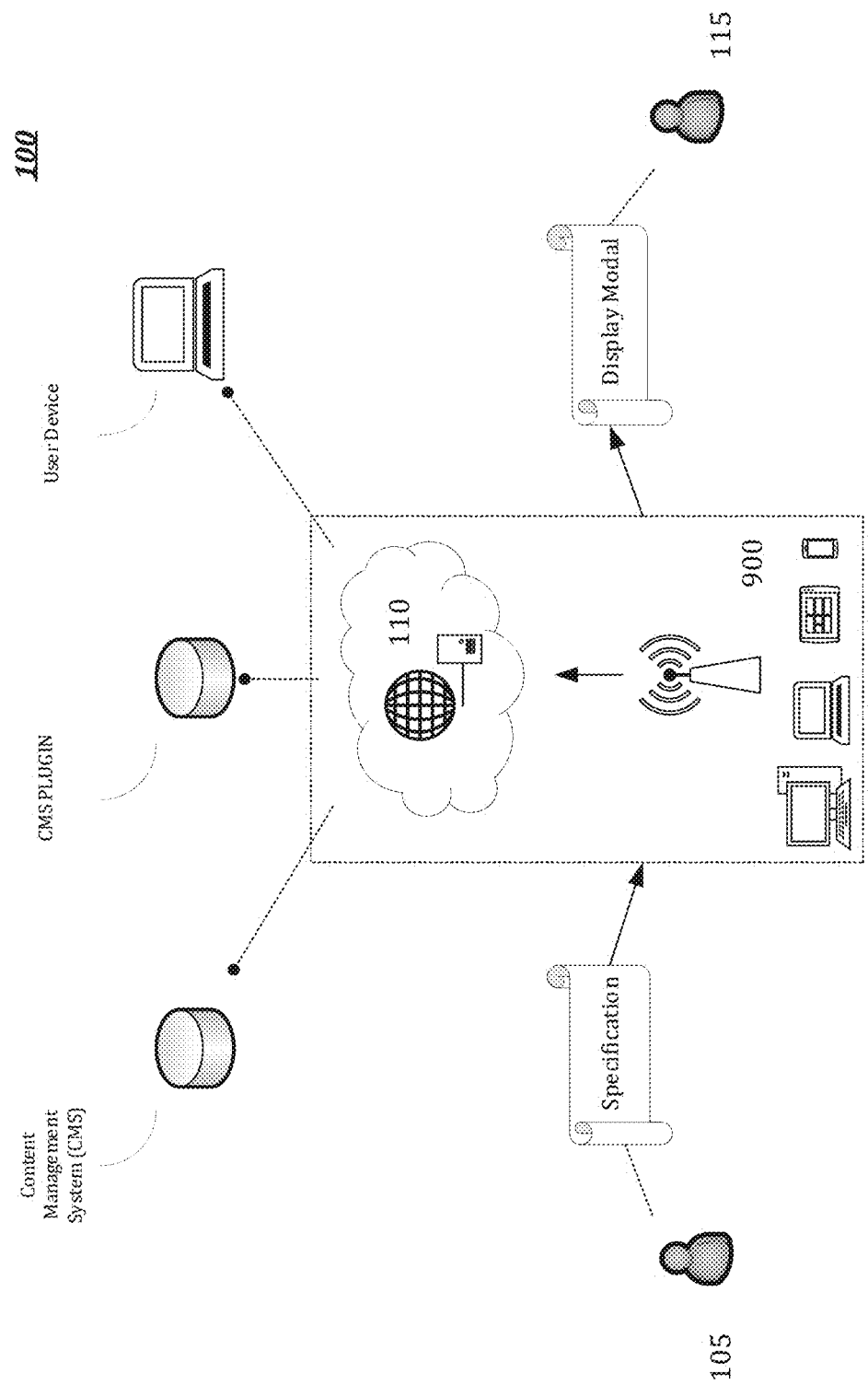
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of summary generation, embodiments of the present disclosure are not limited to use only in this context. For example, the summary generation system may be used identify keywords for retrieving and displaying relevant advertisements, for creating tag clouds corresponding to the documents etc. Furthermore, the present disclosure is written in the context of a document or article to be summarized. It should be understood, however, that any textual content in an electronic format is equally applicable to the embodiments disclosed herein.

I. Platform Overview

Consistent with embodiments of the present disclosure, a system (also referred to herein as a summary generation platform) for facilitating provisioning of a summary of a document may be provided. This overview is provided to introduce a selection of concepts in a simplified form that are further described below. This overview is not intended to identify key features or essential features of the claimed subject matter. Nor is this overview intended to be used to limit the claimed subject matter's scope.

In accordance with some embodiments, the system disclosed herein may facilitate a content publisher to add Scripts/Snippets (also referred to herein as "SkimScripts") to articles (also referred to herein as documents). Examples of articles, may include, but are not limited to, webpages. A SkimScript may include an executable code configured to generate and/or retrieve one or more summaries of the document and a plurality of themes contained in the document. In some embodiments, and as detailed herein, a separate summary may be generated for each of the plurality of themes.

Consistent with embodiments of the present disclosure, a content publisher (e.g., an administrative user of the system) may be enabled to select a SkimScript setting in a Content Management System (CMS), used herein as a generic tool to group technologies content publishers already use. Accordingly, based on the SkimScript settings, each article included in the CMS may be specified as to whether or not it should include a SkimScript. Further still, the content publisher may be enabled to select specific articles or groups of articles for including the SkimScript. In turn, a SkimScript may be added to the article.

In some embodiments, the SkimScript may be added to an article by using an 'add-in/plug-in' to the Content Management System. Alternatively, in some embodiments, the SkimScript may be included in the article based on manual back-end coding to the corresponding article. For example, source code associated with the article may be modified to include the SkimScript. Accordingly, when a browser executes the source code while displaying the article, the corresponding SkimScript may be executed causing at least one of the following: of generation and displaying of the summary. Additionally, execution of the SkimScript may also cause displaying of a plurality of themes contained in the article.

In some embodiments, the SkimScript may be embedded into the backend code associated with a corresponding article. Accordingly, the system may only read/receive the textual content of the article. Further, the SkimScript may make back-end posts/calls via a SkimScript API to the system. Furthermore, the summary and/or the plurality of themes (also referred to herein as "Skims") provided may be based on one or more parameters tied to a specific article and/or a SkimScript. The generation and display of the summary and themes may be based on parameters. The parameters may be specified by the content publisher and/or a consumer viewing the article (e.g., an end-user of the platform). Accordingly, when the article is displayed, the summary and optionally, the plurality of themes may also be displayed.

Embodiments of the system may enable the content publisher to control provisioning of Skims available to readers of an article (i.e., the consumers). According to a first option, the content publisher may be enabled to modify the parameters of a SkimScript for each article through the Content Management System and/or the plug-in. According to a second option, the content publisher may be presented with a portal for administration purposes. The portal may show all articles to which a SkimScript has been applied. Additionally, each SkimScript may communicate to the system a unique ID associated with the article, corresponding parameters/settings, and content to be skimmed. The portal may allow the publisher to set the parameters of each SkimScript for each article. The parameters may include, for example, percentage of article to be skimmed, Auto/Manual mode indicator, enabling/disabling reader-control (e.g., buttons/theme selection etc.). The Auto/Manual mode indicator may indicate which articles may provide a Skim automatically upon a consumer's loading of the article, and which articles may be Skimmed manually, in response to the consumer's input request for a Skim.

Figure 10:
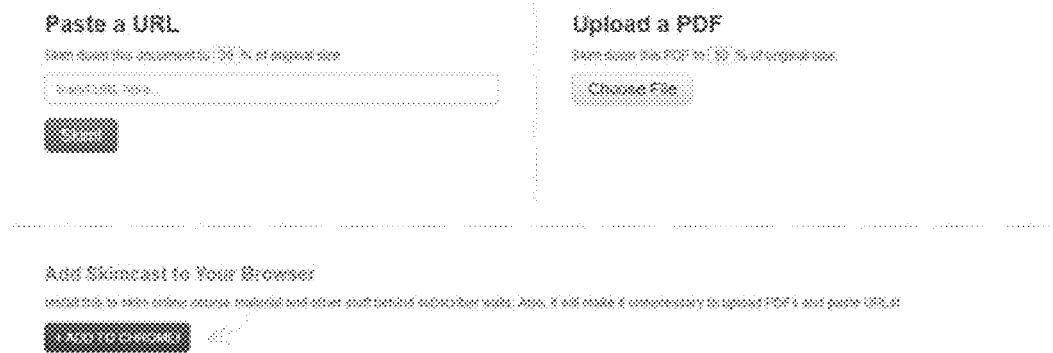
FIG. 10 illustrates a screenshot of a user-interface configured for enabling a user to upload a document and/or specify a hyperlink of the document in order to generate a summary of the document, in accordance with some embodiments.

Still consistent with embodiments of the present disclosure, the system may be configured to generate a user-interface, such as for example, as depicted in FIG. 10, configured for receiving an electronic document or website (collectively referred to as a document). Once specified, the document may be uploaded to the system or a hyperlink of the website may be provided. In some embodiments, a web-browser plugin/extension may be provided that allows a user to select a currently displayed website.

Figure 11:
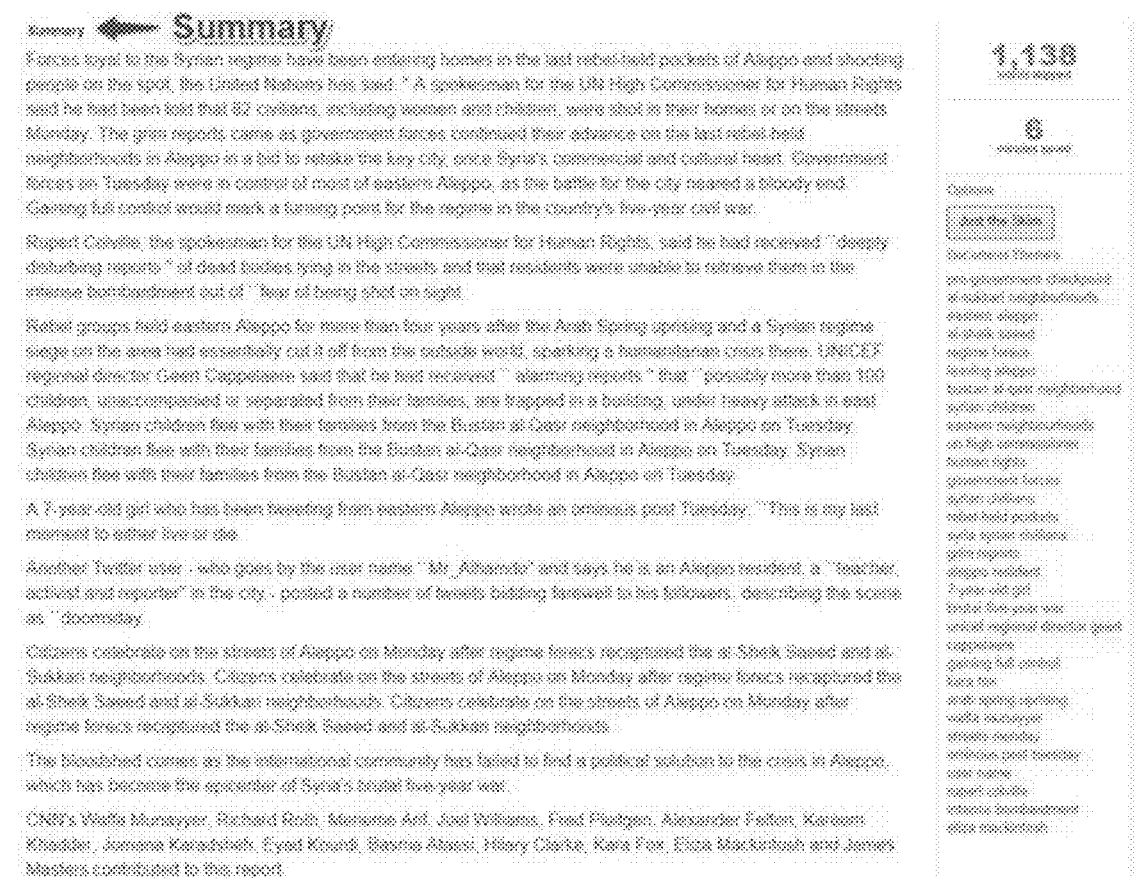

Once the document has been uploaded to the system, the system may execute algorithms to identify salient excerpts from the textual content within the website or uploaded article. The system may then output a summary and a plurality of themes associated with the website/document as illustrated in FIG. 11. It should be understood that FIG. 10 and FIG. 11 only illustrate possible examples of an input and output associated with the systems, and that other embodiments are contemplated to be within the scope of the present disclosure.

Figure 12:
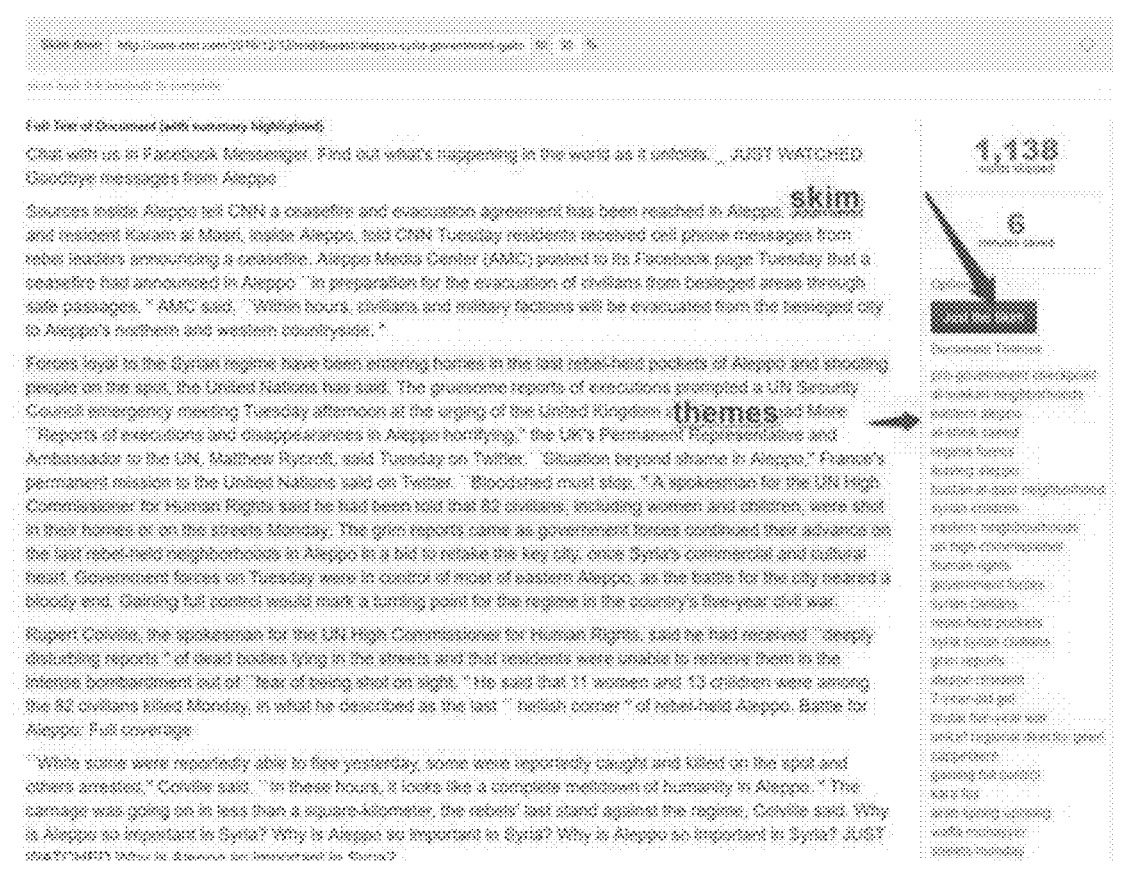

To provide a summary, or "Skim", subsequent to identifying the salient excerpts, the system may Skim through the article and retrieve all salient excerpts to summarize the textual content of the article. Further, the system may generate the summary of the textual content using the combination of all salient excerpts. Further, the salient excerpts identified for generating the summary may be highlighted as depicted in FIG. 12. Accordingly, the system may modify the textual content within the website or the article to enable a highlighting of relevant excerpts corresponding to one or more user selected themes as illustrated in FIG. 13. Different themes can have different highlighting schemes. The highlighting schemes may be performed by browser overlay. Alternatively, in another instance, the highlighting may be performed via website code modification performed by the system or the plug-in. In yet another instance, other forms of annotations/metadata may be used.

Additionally, in some embodiments, a user may be enabled to specify the percentage of the article and/or the website that needs to be "Skimmed". Accordingly, specifying 20% summary may find different themes than when a 30% summary is specified. In accordance to the various embodiments presented herein, the percentage Skimmed may be modified post-processing, after the document has already been Skimmed.

In additional embodiments, and using the same functional principals described herin, a web browser extension/plugin may enable users to view high-level executive summary of a website even before accessing the website. For example, when a user hovers over a link to a website, the system may popup an abridged executive summary of the website. In this way, a user need not access a website to assess the website's content.

In some embodiments, the system may be configured for providing the summary within the website/content instead of a new website/document. Alternatively, and/or additionally, another website, loaded upon the selection of the selectable element may be used for displaying the summary.

Still consistent with embodiments of the present disclosure, the system may be configured to generate a "Double Skim". First, in accordance to the summarization parameters specified in, for example, or referenced by, for example, a SkimScript, the system may generate a summary of a document. Next, the system may find all technical terms in the entire article. The system may then rank the informativeness of the sentences based on technical terms and select the most informative sentences until the summary is of the desired length.

Viewing the summary as a new document, the system may then extract terms from the summary and rank the terms based on their usage in the summary. Further, the system may choose the strongest terms to be the themes. Accordingly, the list of themes may reflect the context of the summary and may change as the summary length varies.

Consistent with embodiments of the present disclosure, an application (or App) may be provided which is configured to receive a URL/PDF/Photo (sent to SkimCast API to create "Skim"). Accordingly, users may provide electronic documents they would like Skimmed and, in turn, the App may return Skims associated with the electronic documents.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Summary Generation System Configuration

FIG. 1 illustrates one possible operating environment through which a summary generation system consistent with embodiments of the present disclosure may be provided. By way of non-limiting example, the summary generation system 100 may be hosted on a centralized server 110, such as, for example, a cloud computing service. An administrative user 105 (e.g., a content publisher) may access summary generation system 100 through a software application. The software application may be embodied as, for example, but not be limited to, a website, a web application, a desktop application, and a mobile application compatible with a computing device 900. One possible embodiment of the software application may be provided by SkimCast Holdings, LLC.

As will be detailed with reference to FIG. 9 below, computing device 900 through which the summary generation system may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

The administrative user 105 may be for example, but not limited to, a content publisher, and a content creator. In an instance, the user 105 may be a content publisher who may be enabled to provide control commands for controlling generation of summaries corresponding to documents hosted by the content publisher. The control commands may include, for example, but are not limited to, a selection of one or more articles to be summarized, a percentage value based on which the summarization is to be performed, auto/manual mode indicator based on which summary and/or themes may be automatically displayed while displaying a corresponding document, and so on.

In some embodiments, server 110 may receive the specification provided by user 105 and, in turner, may perform methods disclosed herein in order to generate an output including, but not limited to, a Skim comprising summary of a document, a plurality of themes contained in the document and relevant excerpts corresponding to each theme and so on. The summary generation system 100 may be configured to communicate with a computer operated by the user 105 as well as end-user 115. Further, the summary generation system 100 may also be configured to communicate with a Content Management System (CMS), a plug-in of a CMS and a user device operated by an end user, such as a consumer of the output produced by the summary generation system 100. In another exemplary embodiment, components of the summary generation system 100 may be implemented as illustrated in the block diagram of FIG. 9.

Figure 2:
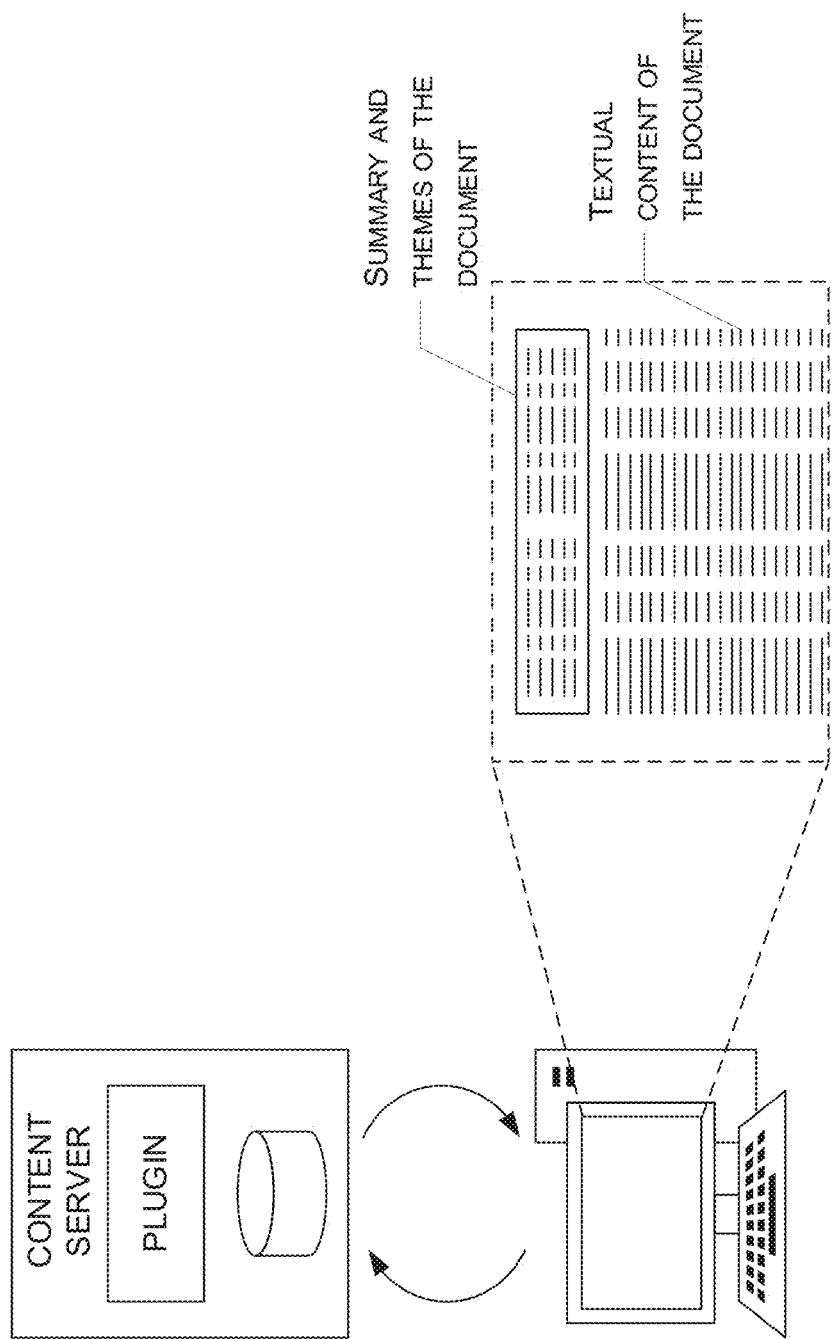
FIG. 2 illustrates a block diagram of a system configured for provisioning a summary of a document to a user device, in accordance with some embodiments.

FIG. 2 illustrates a block diagram of a system configured for provisioning a summary of a document to a user device, in accordance with some embodiments. The system may include a content server hosting digital content, such as documents. For example, the content server may include a Content Management System (CMS) configured to facilitate provisioning of content to one or more client devices, such as, for example the user device.

Accordingly, the system may be configured to communicate with the user device over a communication network, such as, but not limited to, the Internet. Further, the system may be configured to receive a request for a document from the user device. For instance, the request may be generated based on a user of the user device clicking on a hyperlink of the document. The system may be configured to transmit the document to the user device upon receiving the request.

In some instances, the document may include code, such as HTML or javascript. Accordingly, the document may be displayed on the user device using a web browser executing on the user device. Alternatively, the document may of any other format, such as, but not limited to, plain text format, rich text format, Portable Document Format (PDF) and so on.

When the document includes HTML, it may correspond to a, for example, a published article. The document may comprise a plurality of elements, such as, for example, but not be limited to, graphical, textual, and advertisement content. Embodiments of the present disclosure are enabled to process only the textual content to be skimmed, without interference from or causing interface to the other elements of the document.

To achieve this, in one instance, the document to be skimmed may include a SkimScript consistent with the embodiments disclosed herein. In addition, the textual content to be skimmed within the document may be enclosed in identifiable HTML tags (e.g., <DIV class="skimcast">). In turn, when the SkimScript is executed for document, only the text between the <DIV class="skimcast"> tags is processed. All other HTML content on the page may be rendered by the browser in the usual way. Below is one example of the aforementioned technique:

<HTML>
    <HEAD>
    <TITLE>Sample page</TITLE>
    </HTML>
    <BODY>
    <DIV>
    ads, links to other articles
    </DIV>
    <DIV class="skimcast" summary_length=30% or other possible parameters to Skimcast>
    text to be skimmed
    </DIV>
    </BODY>
    </HTML>

Additionally, the system may include a plug-in configured to be in operative communication with the Content Management System (CMS). Further, the plug-in, in some embodiments, may be configured to retrieve documents containing textual content and generate a summary and/or a plurality of themes associated with a corresponding document.

Accordingly, in some embodiments, the plug-in may periodically and/or at predetermined times, generate summaries and themes corresponding to the documents stored in the CMS. Further, in some embodiments, the plug-in may generate the summaries and themes based on predefined events, such as, for example, addition of a new document, modification of an existing document, issuance of command by a user of the CMS, etc.

Further, in some embodiments, the plug-in may be configured to intercept all communication between the CMS and the user device. Accordingly, the CMS may not require any modification in order to provide the summaries and the themes. In other words, the plug-in may receive requests for documents and transmit these requests to the CMS. Subsequently, the plug-in may receive the requested documents from the CMS and generate the summaries and the themes of the documents. Further, the plug-in may insert the summaries and the themes into the documents. Accordingly, the plug-in may modify the contents of the documents in order to include the summaries and themes. Further, the format of the summaries and the themes may be based on corresponding formats of the documents. For example, if the document is a webpage having the HTML format, the summaries and the themes may be encoded into HTML code of the webpage. Accordingly, a web browser executing on the user device may display the summaries and the themes while displaying the webpage.

Figure 3:
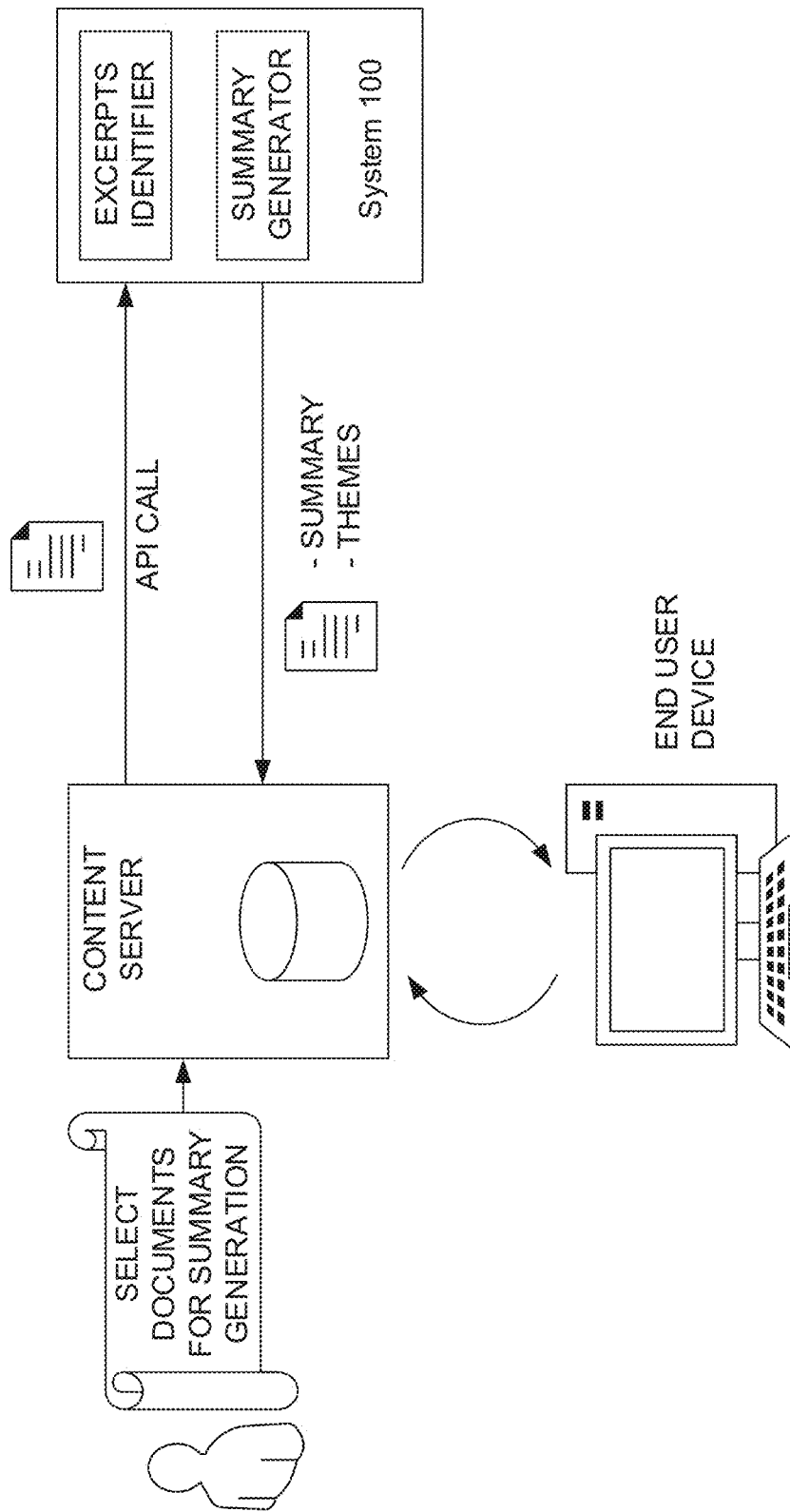
FIG. 3 illustrates a block diagram of a system configured to communicate with a content sever for provisioning a summary of a document, in accordance with some embodiments.

FIG. 3 illustrates a block diagram of a system configured to communicate with a content sever for provisioning a summary of a document, in accordance with some embodiments. The system may include an excerpts identifier configured for identifying a plurality of salient excerpts based on a textual analysis of the document. Further, the system may include a summary generator configured for generating the summary of the document based on the salient excerpts. Accordingly, the system may be configured to communicate with one or more content servers as illustrated. Further, the content server may be configured to transmit an API call to the system in order to generate the summary of the document. The API call may, in some embodiments, include the textual content of the document. Alternatively, in some embodiments, the API call may include a hyperlink or a document identifier associated with the document. Accordingly, the system may be configured to retrieve the document from another source, based on the hyperlink or the document identifier. Additionally, the API call may include one or more parameters that control the process of summary generation performed by the system. Accordingly, one or more of the excerpts identifier and the summary generator may be configured to operate based on the one or more parameters. For example, the one or more parameters may include a percentage value. Accordingly, the system may generate the summary based on the percentage value. As a result, a length of the summary, expressed for example in number of words, may depend on the percentage value.

Further, the content server may be configured to allow an administrator or a content publisher to specify the documents for which summary generation is to be performed. Additionally, the administrator may also be enabled to specify the one or more parameters.

Accordingly, the system may generate and transmit the summary to the content server. Consequently, when a user requests for a document, the content server may transmit each of the document and/or the associated summary.

Further, in some embodiments, the system may be further configured to generate themes contained in the document and transmit the themes back to the content server. Accordingly, the content sever may be able to provide one or more of the document, the summary and the themes to the user device based on the request for the document.

Figure 4:
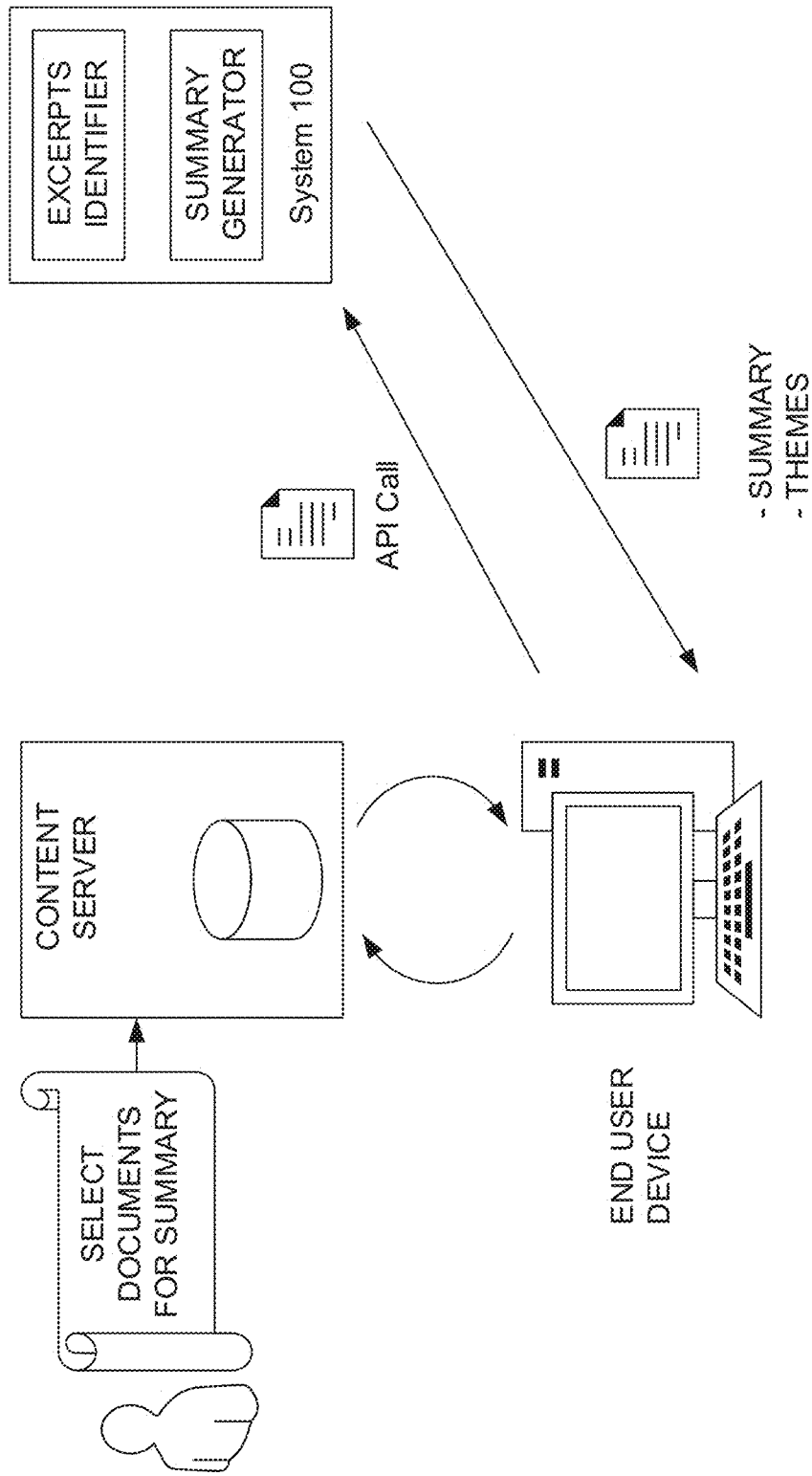
FIG. 4 illustrates a block diagram of a system configured to communicate with a user device for provisioning a summary of a document, in accordance with some embodiments.

FIG. 4 illustrates a block diagram of a system configured to communicate with a user device for provisioning a summary of a document, in accordance with some embodiments. In this embodiment, a plug-in included in the content server may insert executable code (or script) within the documents, such as webpages, hosted by the content server. Accordingly, when a user requests for a webpage, the content server may provide a modified webpage containing the script. When a browser on the user device executes the code associated with the webpage, the script may also be executed. As a result, an API call along with the content of the document and the one or more parameters may be transmitted to the summary generation system. In response, the summary generation system may generate the summary and transmit the summary to the user device for displaying. Likewise, in some embodiments, the summary generation system may be further configured to generate and transmit themes of the document to the user device for displaying.

III. Summary Generation System Operation

Although methods 500, 600, 700 and 800 have been described to be performed by platform 100, it should be understood that computing device 900 may be used to perform the various stages of methods 500, 600, 700 and 800. Furthermore, in some embodiments, different operations may be performed by different networked elements in operative communication with computing device 900. For example, server 110 may be employed in the performance of some or all of the stages in methods 500, 600, 700 and 800. Moreover, server 110 may be configured much like computing device 900.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 500, 600, 700 and 800 will be described in greater detail below.

Figure 5:
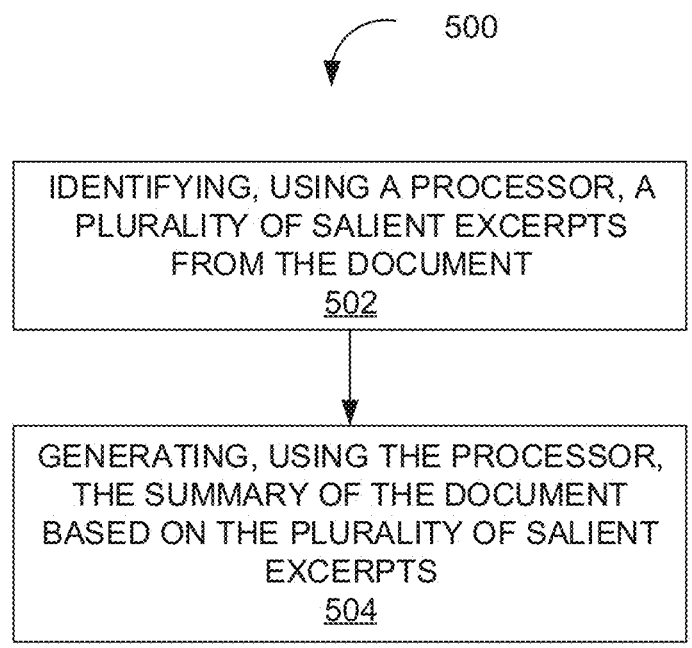
FIG. 5 illustrates a flowchart of a method of providing a summary of a document, in accordance with some embodiments.

FIG. 5 illustrates a flowchart of a method 500 of identifying salient excerpts from a document in order to provision a summary of the document, in accordance with some embodiments. The method 500 may include a step 502 of identifying, using a processor, a plurality of salient excerpts from the document. Further, the method 500 may include a step 504 of generating, using the processor, the summary of the document based on the plurality of salient excerpts.

In some embodiments, the method 500 may further include storing, using a storage device, each of the summary and a document indicator associated with the document.

In some embodiments, the method 500 may further include receiving a percentage value corresponding to the document. Further, a length of the summary may be based on the percentage value. In some embodiments, one or more of the identifying and the generating may be performed based further on the percentage value.

In some embodiments, the method 500 may further include identifying a plurality of themes associated with the document. The plurality of themes may represent the semantic content of the document. For example, a news article about the refugee scenario in a particular country may include the themes of illegal migration, refugees, immigration problems, and so on depending on the content of the news article. Further, the method 500 may include displaying a plurality of theme indicators corresponding to the plurality of themes. The plurality of theme indicators may be, for example, but not limited to, textual labels corresponding to the themes.

In some embodiments, the method 500 may further include identifying, using the processor, a plurality of relevant excerpts associated with the plurality of themes. In some instances, the relevant excerpts may be part of and/or include the salient excerpts identified during summary generation. Alternatively, in some other instances, the relevant excerpts may not be part of and/or include the salient excerpts.

In some embodiments, the method 500 may further include receiving, using an input device, a selection of at least one theme indicator of the plurality of theme indicators. Further, the method 500 may include displaying, using a display device, at least one relevant excerpt corresponding to the at least one theme based on the selection. In some embodiments, displaying may include highlighting the at least one relevant excerpt. For example, as illustrated in FIG. 13, selection of a theme indicator may highlight the relevant excerpts in the document.

In some embodiments, the method 500 may further include receiving, using an input device, a selection of the document. Further, the method 500 may include displaying, using a display device, each of the document and the summary of the document based on the selection.

In some embodiments, the method 500 may further include receiving, using an input device, a first selection of the document. Further, the method 500 may include displaying, using a display device, the document based on the first selection. Furthermore, the method 500 may include receiving, using the input device, a second selection of a summary indicator corresponding to the document. Additionally, the method 500 may include displaying, using the display device, the summary of the document based on the second selection.

In some embodiments, the method 500 may further include displaying, using the display device, a document indicator corresponding to the document. In some embodiments, the document indicator may include a hyperlink. Additionally, the method 500 may include receiving, using an input device, a selection of the document indicator. In some embodiments, the selection may include one or more of a mouse-over operation, a click operation and a touch operation performed on the document indicator. Additionally, the method 500 may include displaying, using the display device, the summary of the document in an overlay based on the selection of the document indicator. For example, the overlay may be in the form of a popup window.

In some embodiments, the method 500 may further include receiving, using a communication interface, an Application Programming Interface (API) call corresponding to the document. Further, the API call may include the document indicator. Further, each of the identifying and the generating may be performed based on the API call. Additionally, the method 500 may include transmitting, using the communication interface, the summary of the document.

In some embodiments, the method 500 may further include embedding a script within the document. Further, displaying of the document may cause execution of the script. Further, execution of the script may cause generation of the API call.

In some embodiments, the API call may include textual content comprised in the document. In some embodiments, the API call further may include at least one parameter associated with the document. Further, one or more of the identifying of the plurality of salient excerpts and the generating of the summary may be based on the at least one parameter.

In some embodiments, the at least one parameter may include one or more of a percentage value, a summary display mode and a theme display mode. Further, the summary may be automatically displayed based on a value of the summary display mode. Further, a plurality of theme indicators may be automatically displayed based on the theme display mode. The plurality of theme indicators may correspond to a plurality of themes identified in the document.

Figure 6:
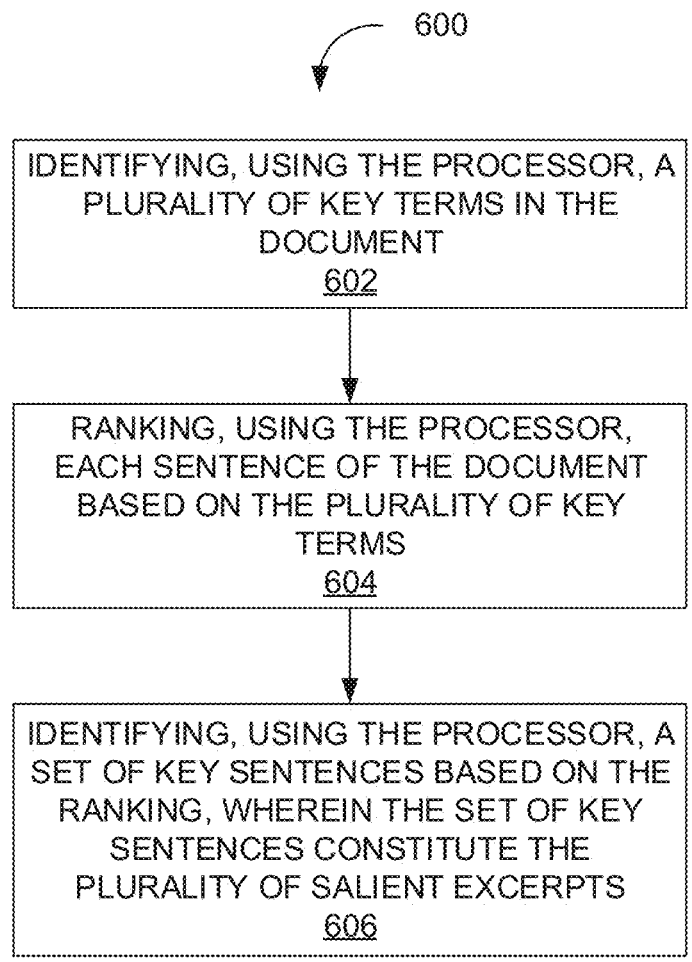
FIG. 6 illustrates a flowchart of a method of identifying salient excerpts from a document in order provision a summary of the document, in accordance with some embodiments.

FIG. 6 illustrates a flowchart of a method 600 of identifying salient excerpts from a document in order to provision a summary of the document, in accordance with some embodiments. The method 600 may include a step 602 of identifying, using the processor, a plurality of key terms in the document. Further, the method 600 may include a step 604 of ranking, using the processor, each sentence of the document based on the plurality of key terms. Additionally, the method 600 may include a step 606 of identifying, using the processor, a set of key sentences based on the ranking. Furthermore, the set of key sentences may constitute the plurality of salient excerpts.

In some embodiments, the method 600 may further include receiving, using an input device, a length of the summary. Accordingly, identifying the set of key sentences may be based on the length of the summary.

Figure 7:
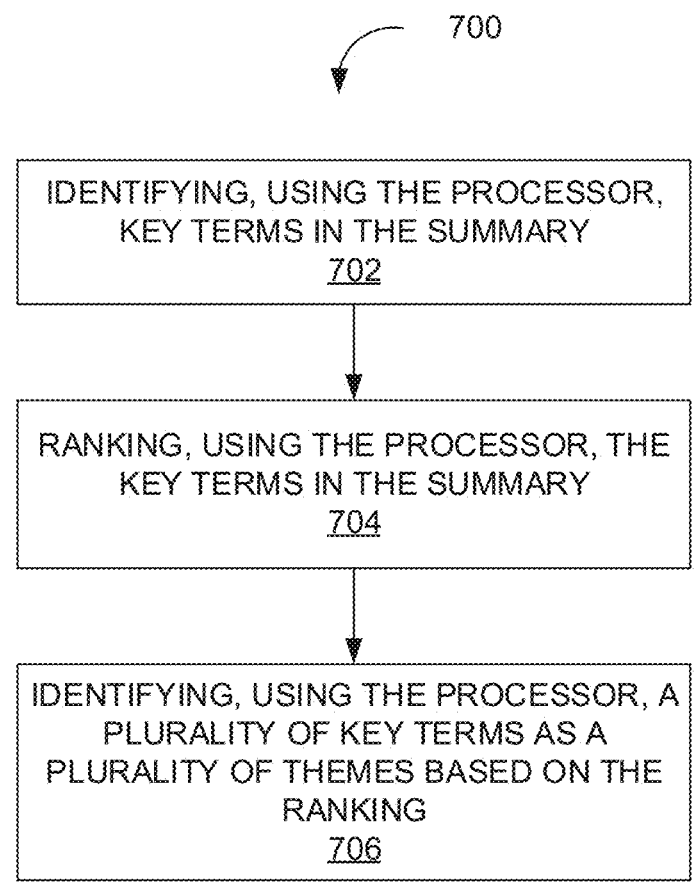
FIG. 7 illustrates a flowchart of a method of identifying a plurality of themes in a document, in accordance with some embodiments.

FIG. 7 illustrates a flowchart of a method 700 of identifying a plurality of themes in a document, in accordance with some embodiments. The method 700 may include a step 702 of identifying, using the processor, key terms in the summary. Further, the method 700 may include a step 704 of ranking, using the processor, the key terms in the summary. Additionally, the method 700 may include a step 706 of identifying, using the processor, a plurality of key terms as a plurality of themes based on the ranking. As a result of generating the plurality of themes based on the summary, a more accurate list of themes in the document may be identified and displayed to users.

Figure 8:
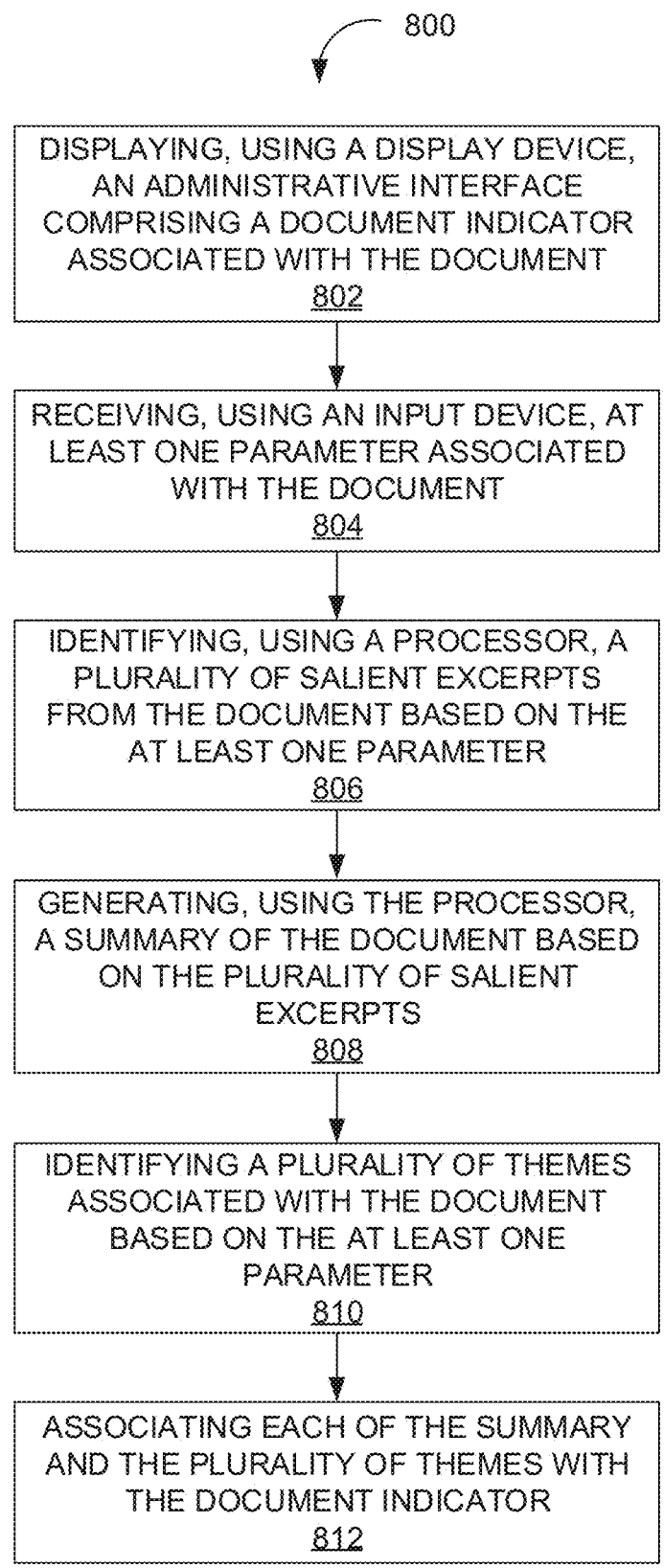
FIG. 8 illustrates a flowchart of a method of provisioning a summary of a document by enabling an administrator to specify at least one parameter based on which the summary and a plurality of themes in the document may be generated, in accordance with some embodiments.

FIG. 8 illustrates a flowchart of a method 800 of provisioning a summary of a document by enabling an administrator to specify at least one parameter based on which the summary and a plurality of themes in the document may be generated, in accordance with some embodiments. The method 800 may include a step 802 of displaying, using a display device, an administrative interface including a document indicator associated with the document. For example, the administrative interface may be displayed on a computing device operated by a content publisher or an administrator of a content server. Further, the method 800 may include a step 804 of receiving, using an input device, at least one parameter associated with the document. Additionally, the method 800 may include a step 806 of identifying, using a processor, a plurality of salient excerpts from the document based on the at least one parameter. Further, the method 800 may include a step 808 of generating, using the processor, the summary of the document based on the plurality of salient excerpts generated at step 806. Further, the method 800 may include a step 810 of identifying a plurality of themes from the document based on the at least one parameter. Finally, the method 800 may include a step 812 of associating each of the summary and the plurality of themes with a document indicator of the document, such as for example, a document identifier or a hyperlink of the document.

Further, the at least one parameter may include one or more of a percentage value, a summary display mode and a theme display mode. Further, the summary may be automatically displayed based a value of the summary display mode. Further, a plurality of theme indicators may be automatically displayed based on the theme display mode. Further, the plurality of theme indicators may correspond to a plurality of themes identified in the document.

IV. Summary Generation System Architecture

The summary generation system 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, summary generation system 100 may be hosted on a centralized server, such as, for example, a cloud computing service.

Embodiments of the present disclosure may comprise a system having a memory storage and a processing unit. FIG. 9 is a block diagram of a system including computing device 900 that may in some instances implement the summary generation system 100. Consistent with some embodiments of the disclosure, the aforementioned memory storage and processing unit may be implemented in a computing device, such as computing device 900 of FIG. 9. Any suitable combination of hardware, software, or firmware may be used to implement the memory storage and processing unit. For example, the memory storage and processing unit may be implemented with computing device 900 or any of other computing devices 918, in combination with computing device 900. The aforementioned system, device, and processors are examples and other systems, devices, and processors may comprise the aforementioned memory storage and processing unit, consistent with embodiments of the disclosure.

Figure 9:
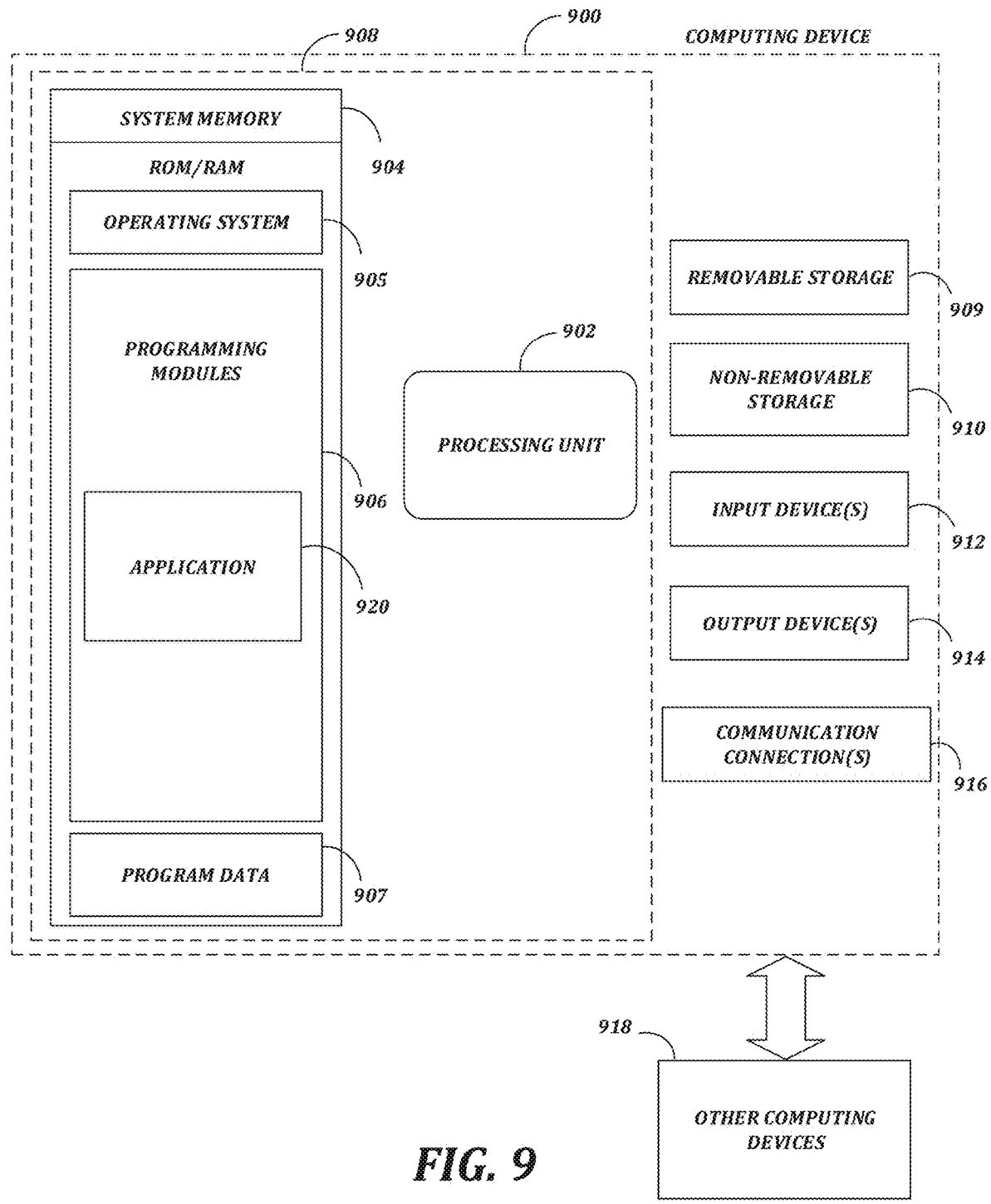
FIG. 9 a block diagram of a computing device configured for provisioning a summary of a document, in accordance with an embodiment.

With reference to FIG. 9, a system consistent with some embodiments of the disclosure may include a computing device, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In some embodiments, programming modules 906 may include salient excerpts identifying module, summary generation module, themes identifying module, highlighting module, code modifying module etc. Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902, programming modules 906 (e.g., summary generation system application 920) may perform processes. The aforementioned process is an example, and processing unit 902 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

IV. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A method for providing a summary of an electronic content, the method comprising:
   receiving an indication of the electronic content from at least one of the following:
     a content management system (CMS), and
     a user system;
   identifying, using a processor, the following:
     a plurality of salient excerpts from the electronic content; and
       wherein identifying the plurality of salient excerpts comprises:
         identifying, using the processor, a plurality of key terms in the electronic content,
         ranking, using the processor, each sentence of the electronic content based on the plurality of key terms,
         identifying, using the processor, a set of key sentences based on the ranking,
           wherein the set of key sentences constitute the plurality of salient excerpts, and
     a plurality of themes associated with the electronic content;
   generating, using the processor, the following:
     the summary of the document based on the plurality of salient excerpts, and a plurality of theme indicators corresponding to the plurality of themes; and sending the summary of the electronic content and the plurality of theme indicators to be displayed to one of the following:
the CMS that provided the indication of the electronic content, and
the user system that provided the indication of the electronic content.

2. The method of claim 1, further comprising storing, using a storage device, each of the summary of the electronic content and the plurality of theme indicators associated with the electronic content.

3. The method of claim 1, further comprising receiving a percentage value corresponding to the electronic content, wherein a length of the summary is based on the percentage value.

4. The method of claim 3, wherein at least one of the identifying and the generating is performed based further on the percentage value.

5. The method of claim 1, further comprising identifying, using the processor, a plurality of relevant excerpts associated with the plurality of themes.

6. The method of claim 5, further comprising:
receiving, using an input device, a selection of at least one theme indicator of the plurality of theme indicators; and
displaying, using a display device, at least one relevant excerpt corresponding to at least one theme based on the selection.

7. The method of claim 6, wherein displaying comprises highlighting the at least one relevant excerpt.

8. The method of claim 1, further comprising:
receiving, using an input device, a selection of the electronic content; and
displaying, using a display device, each of the electronic content and the summary of the electronic content based on the selection.

9. The method of claim 1, further comprising:
receiving, using an input device, a first selection of the electronic content;
displaying, using a display device, the electronic content based on the first selection;
receiving, using the input device, a second selection of a summary indicator corresponding to the electronic content; and
displaying, using the display device, the summary of the electronic content based on the second selection.

10. The method of claim 9, further comprising:
displaying, using the display device, a document indicator corresponding to the electronic content;
receiving, using the input device, a selection of the document indicator; and
displaying, using the display device, the summary of the electronic content in an overlay based on the selection of the document indicator.

11. The method of claim 10, wherein the document indicator comprises a hyperlink.

12. The method of claim 10, wherein the selection comprises at least one of a mouse-over operation, a click operation and a touch operation performed on the document indicator.

13. The method of claim 10, further comprising:
receiving, using a communication interface, an Application Programming Interface (API) call corresponding to the electronic content, wherein the API call comprises the document indicator, wherein each of the identifying and the generating is performed based on the API call; and
transmitting, using the communication interface, the summary of the electronic content.

14. The method of claim 13, further comprising embedding a script within the electronic content, wherein displaying of the electronic content causes execution of the script, wherein execution of the script causes generation of the API call.

15. The method of claim 13, wherein the API call comprises textual content comprised in the electronic content.

16. The method of claim 13, wherein the API call further comprises at least one parameter associated with the electronic content, wherein at least one of the following:
identifying of the plurality of salient excerpts,
identifying the plurality of themes,
generating of the summary, and
generating the plurality of theme indicators,
is based on the at least one parameter.

17. The method of claim 16, wherein the at least one parameter comprises at least one of a percentage value, a summary display mode and a theme display mode, wherein the summary is automatically displayed based a value of the summary display mode, wherein the plurality of theme indicators is automatically displayed based on the theme display mode.

18. The method of claim 1, further comprising receiving, using an input device, a length of the summary, wherein identifying the set of key sentences is based on the length of the summary.

19. The method of claim 1, further comprising:
identifying, using the processor, key terms in the summary;
ranking, using the processor, the key terms in the summary; and
identifying, using the processor, the plurality of key terms as the plurality of themes based on the ranking.

20. The method of claim 1, being performed by a plug-in associated with the CMS comprising the electronic content.

21. The method of claim 1, further comprising:
displaying, using a display device, an administrative interface comprising a document indicator associated with the electronic content; and
receiving, using an input device, at least one parameter associated with the electronic content, wherein the generating of the summary is based further on the at least one parameter, wherein the at least one parameter comprises at least one of a percentage value, a summary display mode and a theme display mode, wherein the summary is automatically displayed based on a value of the summary display mode, wherein a plurality of theme indicators is automatically displayed based on the theme display mode, wherein the plurality of theme indicators correspond to a plurality of themes identified in the electronic content.

22. A system configured to provide a summary of an electronic content, the system comprising:
a processor configured to provide a Content Management System (CMS) integration;
wherein the CMS integration configured to:
receive a specification of at least one web page associated with the electronic content for summarization and theme generation, identify the following:
a plurality of salient excerpts from the electronic content, wherein in order to identify the plurality of salient excerpts, the CMS integration is further configured to:
identify a plurality of key terms in the electronic content,
ranking each sentence of the electronic content based on the plurality of key terms, and identify a set of key sentences based on the ranking, wherein the set of key sentences constitute the plurality of salient excerpts; and
a plurality of themes from the electronic content, and generate the following:
the summary of the electronic content based on the plurality of salient excerpts, and
the plurality of theme indicators associated with the plurality of themes,
insert a snippet of code into at least one web page, wherein the snippet of code comprises a set of computer-executable instructions, transmit the summary of electronic content, and
transmit the plurality of theme indicators; and
an end-user system configured to:
load the at least one web page, wherein the at least one web page comprises the snippet of code, and
execute the set of computer-executable instructions comprised in the snippet of code, in order to:
transmit a request for the summarization and the theme generation,
receive the summary of electronic content, and
receive the plurality of theme indicators.

23. The system of claim 22, wherein the processor is a content server configured to provision the electronic content.

24. The system of claim 22, wherein the end-user system is a user device configured to present the electronic content to a user operating the user device.

25. The system of claim 22, wherein the CMS integration is further configured to receive a length of the summary, wherein the CMS integration being configured to identify the set of key sentences comprises the CMS integration being configured to identify the set of key sentences is based on the length of the summary.

26. The system of claim 22, wherein the CMS integration is further configured for:
identify key terms in the summary;
rank the key terms in the summary; and
identify a plurality of key terms as a plurality of themes based on the ranking.

27. The system of claim 22, wherein the CMS integration is further configured to:
receive, from an electronic device, a plurality of Application Programming Interface (API) calls corresponding to the electronic content,
wherein a first API call of the plurality of API calls is configured to:
transmit a specification of at least one web page having the electronic content for at least one of summarization of the electronic content and generation of theme indicators, wherein the specification comprises a document indicator associated with electronic content to be summarized and theme indicators generated,
wherein the CMS integration is configured to perform the summarization of the electronic content and the theme indicators generation based on the first API call;
wherein a second API call of the plurality of API calls is configured to:
transmit a request for the summary of the electronic content, and
transmit a request for a plurality of theme indicators associated with the electronic content;
wherein a third API call of the plurality of API calls is configured to:
receive the summary of electronic content, and
receive the plurality of theme indicators; and
transmitting, to the electronic device, at least one of the summary of the electronic content and the plurality of theme indicators for display.

28. The system of claim 26, wherein the plurality of theme indicators are further based on the plurality of themes.

29. A method for providing a summary of an electronic content, the method comprising:
receiving a selection of the electronic content from a content management system (CMS);
wherein receiving the selection of the electronic content comprises the following:
receiving a selection of a web page,
receiving a selection of electronic content within the web page, and
receiving parameters for summarizing the electronic content;
identifying the following:
a plurality of salient excerpts from the electronic content,
wherein identifying the plurality of salient excerpts comprises:
identifying a plurality of key terms in the electronic content,
ranking each sentence of the electronic content based on the plurality of key terms, and
identifying a set of key sentences based on the ranking,
wherein the set of key sentences constitute the plurality of salient excerpts, and
a plurality of themes associated with the electronic content;
generating the following:
the summary of the electronic content based on the plurality of salient excerpts, and
a plurality of theme indicators corresponding to the plurality of themes; and
transmitting the summary of the electronic content and the plurality of theme indicators to the CMS to be displayed.

* * * * *